May 5, 1970　　　　　J. C. BENNETT　　　　　3,510,395
GAS-COOLED NUCLEAR REACTORS

Filed Dec. 12, 1967　　　　　　　　　　　　　　3 Sheets-Sheet 3

3,510,395
GAS-COOLED NUCLEAR REACTORS
John Charles Bennett, Leatherhead, England, assignor to Atomic Power Constructions Limited, Sutton, Surrey, England, a British company
Filed Dec. 12, 1967, Ser. No. 689,822
Claims priority, application Great Britain, Dec. 14, 1966, 56,078/66
Int. Cl. G21c 19/04
U.S. Cl. 176—59                                    8 Claims

ABSTRACT OF THE DISCLOSURE

A gas-cooled nuclear reactor which includes a pressure vessel, a biological shield within the pressure vessel, and a plurality of fuel element channels in the core, in which coolant gas passages are provided for the passage of all the coolant gas through the side walls of the fuel element channels to the interior thereof at positions disposed above the base, the latter closing the lower ends of the channels to provide a shield against radiation downwardly along the channels.

---

Figure 1:
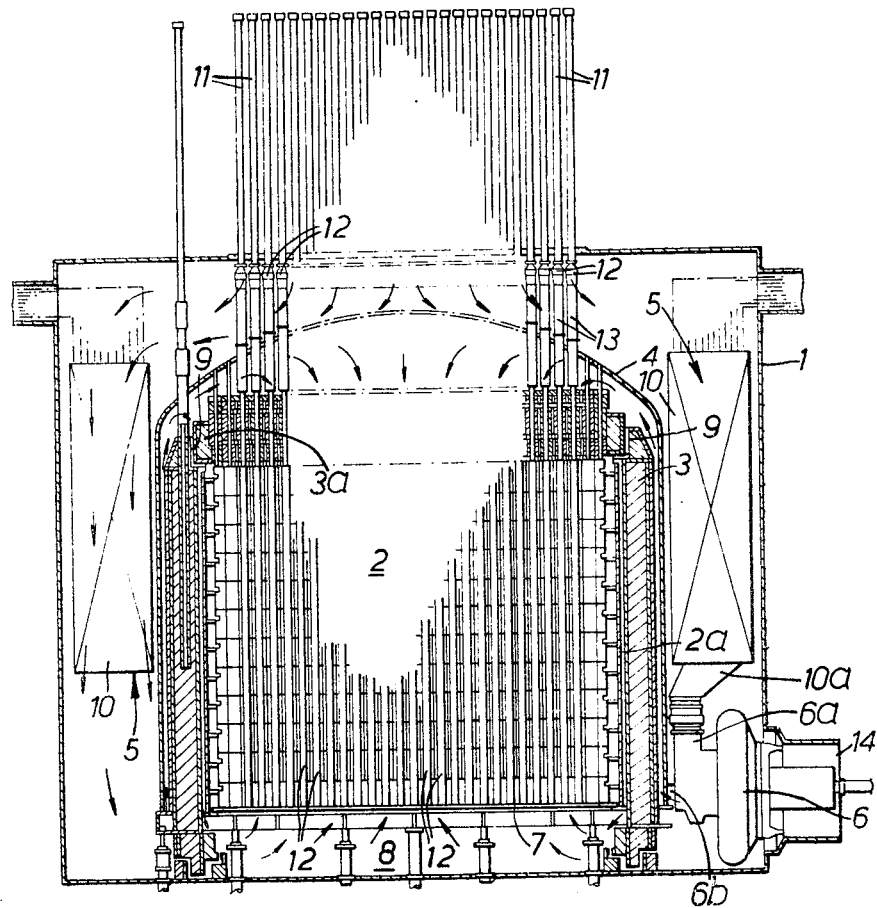

This invention relates to gas-cooled nuclear reactors.

In a known type of gas-cooled nuclear reactor wherein a pressure vessel houses a core and heat exchangers therearound, the coolant gas is circulated upwardly through a plurality of fuel element channels in the core from a plenum chamber beneath the core and downwardly over the heat exchangers. The core is disposed upon a base which defines the upper boundary of the plenum chamber and is provided with a plurality of holes through which coolant gas passes from the plenum chamber to the fuel element channels. The holes in the base are each aligned with a corresponding fuel channel with the result that these holes need to be accurately disposed across the base. Providing the base with large holes for this purpose weakens the plate, is unduly expensive and has a further disadvantage in that a portion of the base is removed which would otherwise provide a degree of radiation shielding directly beneath the fuel elements.

By the present invention there is provided a gas-cooled nuclear reactor which includes a pressure vessel, an inverted cup shaped biological shield within the pressure vessel, a graphite-moderated core within the biological shield, a base upon which the core is mounted, heat exchangers disposed inside the pressure vessel and externally around the biological shield, means for circulating a coolant gas upwardly through a plurality of fuel element channels in the core and around fuel elements therein and downwardly over the heat exchangers, and wherein coolant gas passages are provided for the passage of all the coolant gas through upwardly extending lower end portions of the side walls of the fuel element channels to the interior thereof at positions disposed above the base, the latter closing the lower ends of the channels and thereby providing a shield against radiation emitted downwardly along the channels.

The upwardly extending lower end portions of the side walls of the fuel element channels may each contain a fuel element debris receptacle having perforated side walls for permitting the passage of coolant gas.

In one embodiment of the invention the core is disposed above a coolant gas plenum chamber and includes a plurality of columns of hollow graphite blocks each column forming a fuel channel housing one of a plurality of columns of graphite cylinders containing fuel pins on a cylindrical support. The columns of graphite blocks are disposed adjacent to one another and have interstitial spaces between the lower ends of adjacent columns for the passage of coolant gas through openings in the cylindrical supports each of which provides the said upwardly extending lower end portion of the side wall of the fuel element channels, openings not beneath the fuel channels being provided in the core supporting base for the passage of coolant gas from the plenum chamber to the interstices.

An inverted cup-shaped partition may be disposed within the pressure vessel and externally of the partition, means being provided for circulating coolant gas upwardly between the biological shield and the partition through the top wall of the shield and downwardly between the latter and the core to the plenum chamber.

Passageways may be provided for permitting the flow of a portion of the coolant gas that passes through the top wall of the biological shield downwardly thorugh annular paths between each graphite cylinder and the surrounding fuel channel graphite blocks and to combine the said portion of the coolant gas with coolant gas from the plenum chamber at the coolant gas passages.

The interstitial spaces may be provided by hollow blocks having coolant gas entry and exit passages and, provided on each hollow support, a column of interstitial graphite filler blocks. The filler blocks may be hollow to provide a coolant gas passage for coolant gas flowing from the top of the core to the coolant gas passages. Further coolant gas passages may also be provided between each column of interstitial graphite filler blocks and the surrounding fuel channel graphite blocks such that, in use, a portion of the coolant gas at the top of the core may flow down the further coolant gas passages and combine with the remainder at the first mentioned coolant gas passages.

Figure 2:
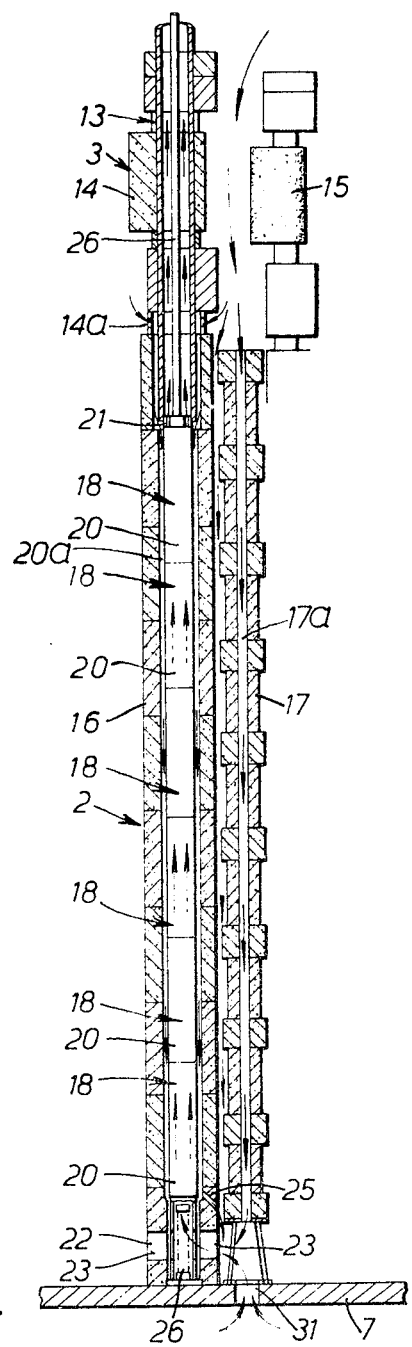
Figure 3:
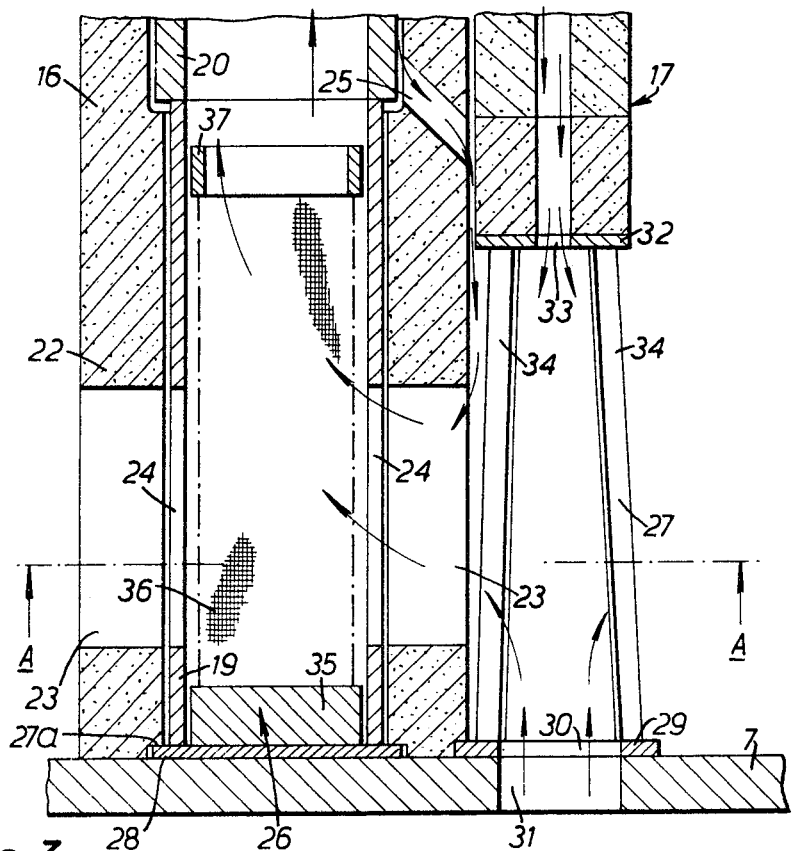
Figure 4:
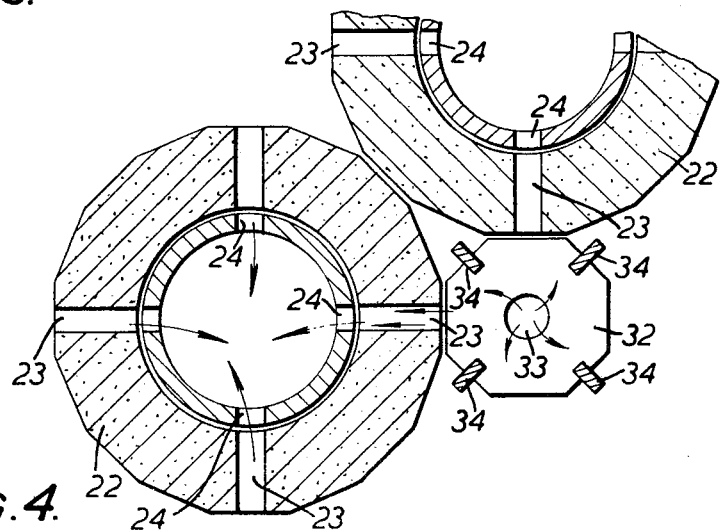

In the accompanying drawings which illustrate, by way of example, an embodiment of the present invention:

FIG. 1 is a sectional side view of a gas-cooled, graphite moderated nuclear reactor, FIG. 2 is an enlarged view of a fuel element channel, a column of interstitial graphite filler blocks and an upper portion of the biological shield of the reactor shown in FIG. 1, FIG. 3 is an enlarged sectional side view of a lower end portion of FIG. 2, and FIG. 4 is a sectional underside view of FIG. 2 along the line IV—IV, FIG. 3.

As shown in FIG. 1 a metal-lined, concrete pressure vessel 1 contains a graphite-moderated core 2, an inverted, cup-shaped biological shield 3, an inverted cup-shaped partition 4, heat exchangers 5 and a plurality of coolant gas circulator assemblies each associated with one of the heat exchangers and one only of which is shown and designated 6.

The core 2 is mounted upon a base 7 having a plenum chamber 8 beneath it. Around the core 2 and spaced therefrom is a partition 2a which is sealed, at its bottom, to the base 7 and, at its top, to the top wall 3a of the biological shield 3. The biological shield 3 has a plurality of coolant gas passages 9 for allowing coolant gas to pass through its wall to the space between the shield 3 and the partition 2a whilst the top wall 3a of the shield is constructed of graphite blocks having coolant gas passages between them as will be described later. Each heat exchanger 5 comprises a bank of heat exchanger tubes (not shown) within a casing 10. Each casing 10 has a coolant gas outlet 10a sealed to the inlet 6a of the coolant gas circulator assembly associated therewith. The coolant gas outlet 6b of each coolant gas circulator is sealed to an inlet opening (not shown) in the partition 4. The lower end of the partition 4 is sealed to the biological shield 3 which, in turn, has its lower end sealed to the floor of the pressure vessel 1.

Each of a plurality of stand pipes 11 is provided with a coolant gas outlet 12 in its wall and the pipes 11 are sealed above this position whilst the reactor is in operation. Each stand pipe 11 has a charge tube 13 forming an extension thereof which extends through the partition 4 and the biological shield 3.

In FIGS. 2 to 4, the lower end portion of a charge tube 13 is shown which extends through the top wall 3a of the biological shield. The top wall 3a is composed of columns of graphite blocks of which two, 14, 15, are shown. The columns are spaced from one another to provide a coolant gas path 14a between them which extends from the upper side of the top wall of the biological shield 3 to the lower side thereof. The graphite blocks of certain columns, for example column 14, are hollow and closely fit around the portion of the charge tube 13. The columns 15 are not hollow and serve to "fill-in" in part the spaces between the columns 14 as is shown in FIG. 4.

A portion of the graphite core 2 is shown comprising columns 16 of hollow graphite blocks and columns 17 of interstitial hollow graphite fellow blocks. The uppermost graphite block in the column 16 is spaced from the superimposed column 14 by a spacer block 14a whose side walls are apertured as shown in FIG. 2 and also encircles the lower end of the portion of the charge tube 13 which projects from column 14 and provides an annular coolant gas pasasge therearound. The hollow graphite blocks in the column 16 together provide a fuel channel containing a plurality of superposed fuel element assemblies 18 which rest upon a hollow support 19 (FIGS. 3 and 4) in the lowermost block in the column 16. Each fuel element assembly 18 comprises a plurality of fuel pins (not shown) supported to extend longitudinally in an open-ended hollow graphite cylinder 20. The interiors of the graphite cylinders 20 form an upwardly extending passage which is sealed to the lower end of the charge tube 13 by an annular seal 21 positioned on the uppermost fuel element assembly 18. The graphite cylinders 20 have an annular space 20a between them and the interior wall of the column 16. The lowermost graphite block 22 in column 16 is closed by the base 7 upon which the block rests and is provided with coolant gas inlet passages 23 aligned with coolant gas inlet passages 24 in the hollow support 19. The graphite block 22 also has coolant gas outlet passages, one of which is shown and designated 25, extending from the annular space 20a between the graphite cylinders 20 and the interior wall of column 16. The hollow support 19 contains a fuel element debris receptacle 26. The graphite blocks of the column 17 are aligned with one another to provide a coolant gas passage 17a which extends for the whole length of the column. The column 17 rests upon a hollow support 27. The base 7 is provided with an opening 31 beneath the hollow support 27. It will be appreciated that the core 2 is composed of a plurality of columns similar to the columns 16 and 17 with each column 17 disposed in an interstitial space between four columns 16 and above an opening 31, see FIG. 4.

The hollow suport 19( FIG. 3) has an annular metal plate 28 secured to its lower end. The metal plate 28 is disposed in a recess 27a in the graphite block 22. The hollow support 27 comprises a base plate 29 having an opening 30 aligned with the opening 31 and a top plate 32 having an opening 33 aligned with the coolant passage through column 17. Four legs 34 extend between the plates 29 and 32. The debris receptacle 26 comprises a base 35, a mesh cylinder 36 providing a perforated side wall and an annular rim 37.

Referring to FIGS. 1 to 4, coolant gas is, in operation, circulated, as indicated by the arrows (in FIG. 1), from the outlets of the coolant gas circulator assemblies upwardly between the biological shield 3 and the partition 4 to the passages 9. A portion of the coolant gas enters the passages 9 whilst the remainder passes upwardly over the top of the biological shield. The coolant gas entering the passages 9 passes downwardly between the biological shield 3 and the partition 2a to the plenum chamber 8 and then enters the openings 31 (FIG. 3) in the base 7. The portion of the coolant gas passing over the top of the biological shield 3 (FIG. 1) passes between the columns 14 and 15 (FIG. 2) and then divides into separate streams one of which passes through the apertures in the spacer block 14a and flows downwardly through the core 2 between the charge tube 13 and the interior wall of column 16, another of which flows between the columns 16 and 17, and the remaining one of which flows down passage 17a in the centre of column 17. The coolant gas passing down between the charge tube 13 and the interior wall of column 16 continues downwardly along the annular space 20a between the cylinders 20 and the interior wall of column 16 and along the gas outlet passages 25. The coolant gas flowing along these various paths through the core 2 maintains the graphite blocks of the columns 16 and 17 at an acceptable temperature. After flowing through the core 2 these streams of coolant gas mix with the coolant gas entering the openings 31 in the base 7 and then the whole of the coolant gas enters the inlets 23 and 24. From the inlets 24 the coolant gas passes upwardly inside the graphite cylinders 20 and around the fuel pins (not shown) contained therein, and is heated by the fuel pins. The heated coolant gas continues upwardly in the charge tubes 13 and passes out through the outlets 12 (FIG. 1). From the outlets 12 the heated coolant gas passes downwardly into the casings 10 over the heat exchanger tubes therein and in so doing is cooled by generating steam from feed water passing into the heat exchanger tubes. The cooled coolant gas is then passed by the gas circulator assemblies between the biological shield 3 and partition 4 once more for re-circulation along the same paths.

It will be appreciated that the openings 31 are considerably smaller than those which would be necessary to supply coolant directly from the plenum chamber to the fuel chambers and thus the base is not weakened by any great extent. Moreover, the openings 31 are not aligned with the fuel chambers so that the base directly beneath the latter provides a degree of radiation shielding from radiation passing downwardly along the channels.

It is not essential to have a plenum chamber beneath the cores as described above. If no plenum chamber is present, coolant gas flows across the upper surface of the base to the inlets in the fuel channels from ports in the side walls of the partition 2a surrounding the core.

I claim:
1. A gas-cooled nuclear reactor which includes a pressure vessel, an inverted cup-shaped biological shield within the pressure vessel, a graphite-moderated core within the biological shield, a base upon which the core is mounted, heat exchangers disposed inside the pressure vessel and externally around the biological shield, means for circulating a coolant gas upwardly through a plurality of fuel element assemblies in fuel channels in the core and around fuel elements therein and downwardly over the heat exchangers, and wherein coolant gas passages are provided for the passage of all the coolant gas through upwardly extending lower end portions of the side walls of the fuel element channels to the interior thereof at positions disposed above the base and the latter closing the lower ends of the channels and thereby providing a shield against radiation emitted downwardly along the fuel channels.

2. A nuclear reactor as claimed in claim 1 wherein the upwardly extending lower end portions of side walls of the fuel element channels each contains one of a plurality of fuel element debris receptacles each having perforations in the side walls thereof for permitting the passage of coolant gas therethrough.

3. A nuclear reactor as claimed in claim 1 wherein the base upon which the core is disposed has a coolant gas plenum chamber thereunder, and the core includes a plurality of columns of hollow graphite blocks each column forming a fuel channel housing a plurality of columns of graphite cylinders containing fuel pins upon a cylindrical support, the columns of graphite blocks being disposed adjacent to one another and having interstitial spaces between the lower ends of adjacent columns for the passage of coolant gas through openings in the cylindrical supports, said cylindrical supports providing the said upwardly extending lower end portion of the side wall of the fuel element channels and openings, not beneath the fuel channels, are provided in the core supporting base for the passage of coolant gas from the plenum chamber to the interstices.

4. A nuclear reactor as claimed in claim 3 wherein an inverted cup-shaped partition is disposed within the pressure vessel, the biological shield extending upwardly within the partition and means being provided for circulating coolant gas upwardly between the biological shield and the partition through a top wall of the biological shield and downwardly between the biological shield and the core to the plenum chamber.

5. A nuclear reactor as claimed in claim 4 wherein passageways are provided for permitting the flow of a portion of the coolant gas that passes through the top wall of the biological shield downwardly along annular paths between each graphite cylinder and the surrounding fuel channel graphite blocks and to combine the said portion of the coolant gas with coolant gas from the plenum chamber at the coolant gas passages.

6. A nuclear reactor as claimed in claim 5 wherein the interstitial spaces are provided by hollow supports having coolant gas entry and exit passages, and on each hollow support a column of interstitial graphite filler blocks is provided.

7. A nuclear reactor as claimed in claim 6 wherein the interstitial graphite filler blocks in each column are hollow to provide a coolant gas passage for coolant gas flowing from the top of the core to the coolant gas passages.

8. A nuclear reactor as claimed in claim 7 wherein further coolant gas passages are provided between each column of interstitial graphite filler blocks and the surrounding fuel channel graphite blocks such that, in use, a portion of the coolant gas at the top of the core may flow down the further coolant gas passages and combine with the remainder at the first mentioned coolant gas passages.

References Cited

UNITED STATES PATENTS

| | | | |
|---|---|---|---|
| 3,192,121 | 6/1965 | Challender et al. | 176—60 |
| 3,296,084 | 1/1967 | Fawcett et al. | 176—59 |
| 3,342,691 | 9/1967 | Warner et al. | 176—60 |

REUBEN EPSTEIN, Primary Examiner

U.S. Cl. X.R.

176—60